April 28, 1953   B. H. PARKER ET AL   2,636,389
GYRO CAGING MECHANISM

Filed Feb. 20, 1952   2 SHEETS—SHEET 1

Inventors:
Edwin P. Uses
Benjamin H. Parker
by Russell A. Warner,
Their Attorney

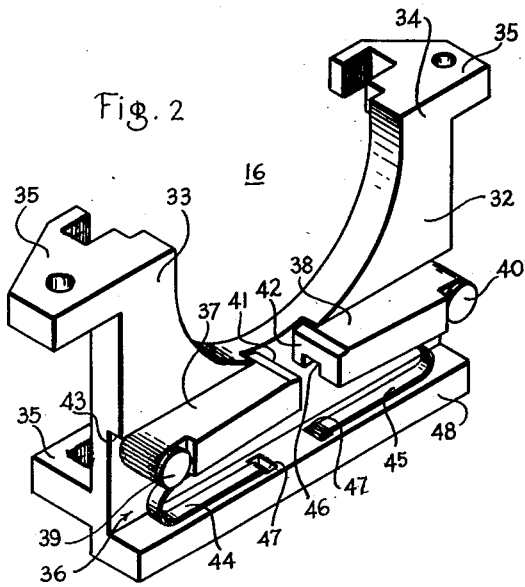
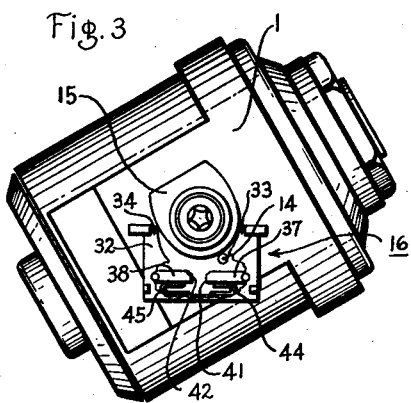
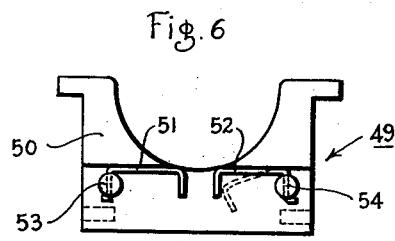
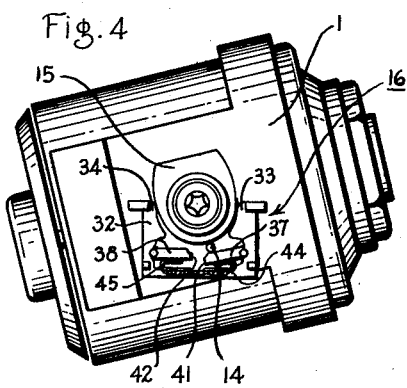
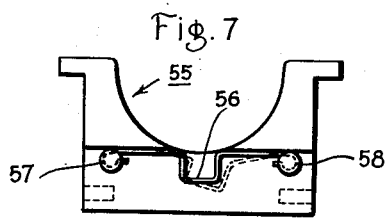
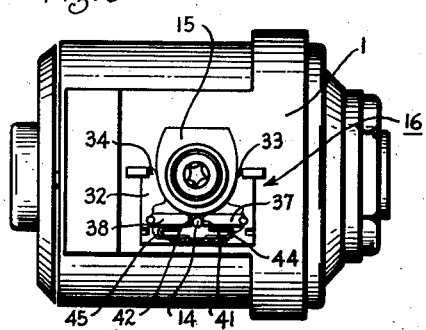
Inventors:
Edwin P. Uses
Benjamin H. Parker
by Russell A. Warner.
Their Attorney Patented Apr. 28, 1953

2,636,389

UNITED STATES PATENT OFFICE 2,636,389

GYRO CAGING MECHANISM

Benjamin H. Parker and Edwin F. Uses, Lynn, Mass., assignors to General Electric Company, a corporation of New York Application February 20, 1952, Serial No. 272,614

8 Claims. (Cl. 74—5.1)

The present invention relates to gyroscopic instruments and, more particularly, to improved directional gyroscope caging arrangements.

It has been common practice to incorporate into directional gyroscope instruments of the conventional type a device which may be manually or automatically actuated to centralize or cage the gyro rotor structure into a predetermined relationship with the gimbal in which the rotor structure is pivotally mounted. This relationship is usualy established as the one wherein the gyro rotor spin axis, of the gyro rotor structure, is perpendicular to the plane defined by the major and minor pivot axes of the gyroscope. In conjunction with such caging, there is normally provided a setting mechanism for aligning the caged gimbal and rotor structure such that the gyro spin axis has a desired azimuth heading, although the novelty in this invention resides in the caging rather than the setting mechanisms.

The need for caging mechanisms which lock the gyro rotor structure of a directional gyroscope with its supporting gimbal is occasioned primarily by the circumstances that the supporting aircraft may perform maneuvers which result in a tilting of the gyro axis from its optimum position in relation to the supporting gimbal, and that, on occasion, the gyroscope spin axis must be forcibly set to a desired azimuth heading, with an attendant precessing effect tending to move the spin axis from its optimum position in its gimbal. Among the important criteria for ideal caging devices of this nature are that they accomplish completed caging rapidly; that the desired caged position be accurately secured in each caging operation; that the caging be maintained with sufficient firmness to preclude accidental uncaging under influence of the sizable gyroscopic forces which may be experienced; that the caging device exert no unwanted forces which may cause erroneous precession of the gyroscope, particularly when the instrument is being uncaged; and, additionally, that the caging mechanism be light in weight, small in size, and simple in construction. In accordance with the present invention, these characteristics are embraced by a caging device which in one embodiment involves a unique caging pin and gating arrangement in combination with certain of the mechanical features of the caging apparatus which is the subject of the Patent No. 2,585,693 of Allen T. Sinks et al., for "Gyroscopic Direction Indicator," and assigned to the same assignee as that of this application.

The preferred caging arrangement here comprises a cam and pin attached to the gyro rotor structure and a caging slide member on the supporting gimbal, the slide member having fingers or projections which engage the cam to pivot the rotor structure about the minor axis until the pin is stopped and locked in position by a gating device mounted on the caging slide member.

One object of the present invention is to provide a novel and improved caging device which firmly locks a gyro rotor structure with its supporting gimbal both accurately and rapidly.

Another object is to provide a simple and reliable directional gyroscope caging mechanism which, in sequence, moves the gyro rotor structure about the minor axis, stops pivotal movement of the rotor structure when the desired caged position is reached, and locks the rotor structure in the caged position.

These and other objects and novel features of the invention appear more fully in the following detailed description wherein reference is made to the accompanying drawings, in which:

Figure 2 is a pictorial view, in perspective, of a preferred embodiment of a caging slide and gating arrangement;

Figures 3, 4 and 5 depict a directional gyro rotor structure and caging device in different stages of a caging operation; and Figures 6 and 7 represent additional embodiments of a caging slide and gating arrangement combination in accordance with this invention.

Figure 1:
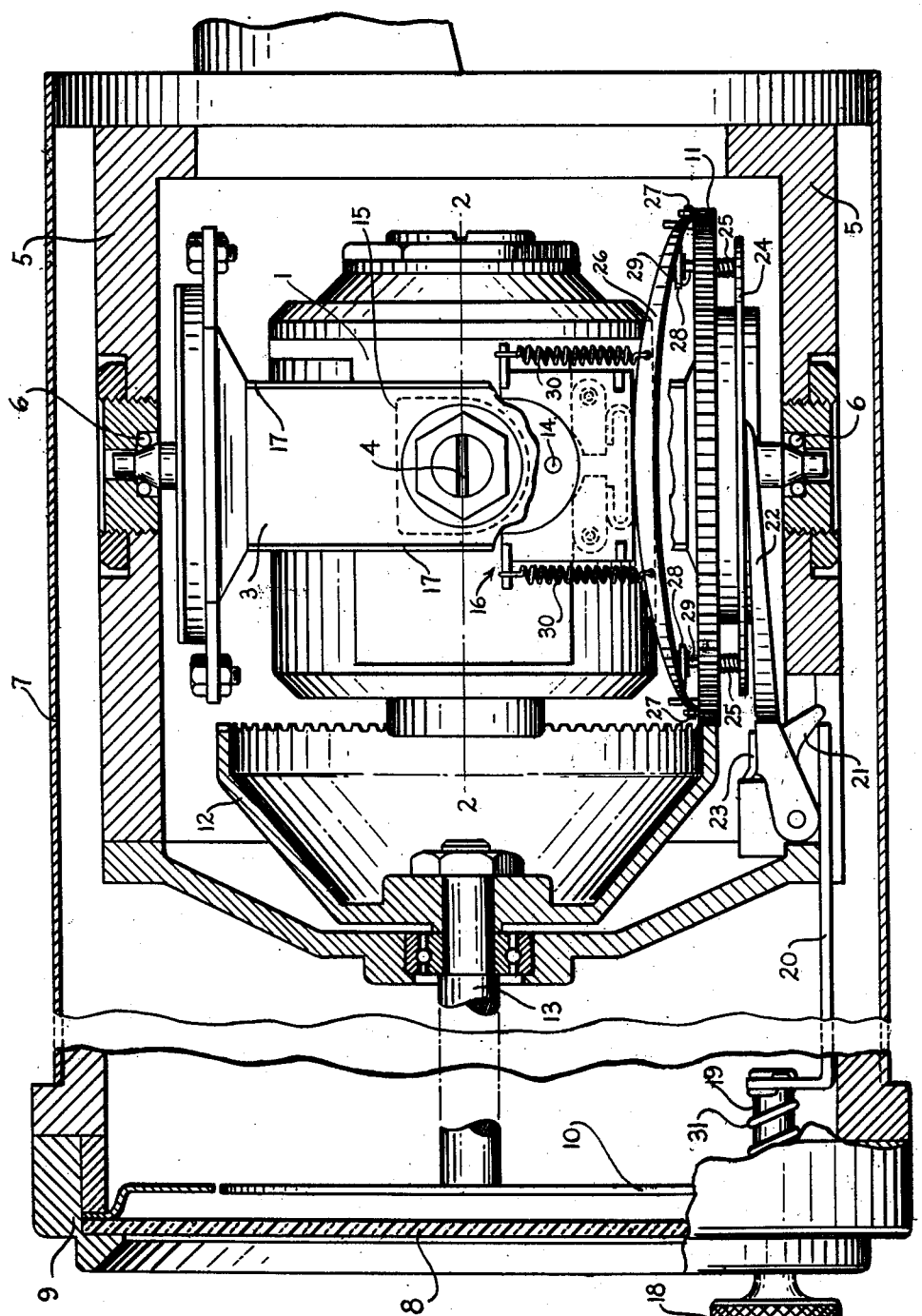
Figure 1 is a cross-sectional side view of a directional gyroscope including the caging mechanism of the present invention.

A direct-reading directional gyroscope adapted for panel mounting in an aircraft is illustrated in Figure 1, together with the unique caging mechanism which forms the subject of this invention. In general construction, this instrument is a conventional three-axis gyroscope, in that it comprises a gyro rotor structure 1, which houses a gyro rotor revolving about the spin axis 2—2 under the influence of electric motive means, not visible, a main gimbal 3, supporting the rotor structure 1 for pivotal movement about the minor axis 4; and an outer frame or gimbal 5 pivotally supporting gimbal 3 for movements in the major axis bearings 6, the major gyro axis being perpendicular to the minor gyro axis. The instrument is contained within an outer casing 7 which has a window 8 in the front flange 9 to permit visual observation of the azimuth dial 10. Translation of the position in azimuth of the main gimbal 3 to the azimuth dial 10 is accomplished by the spur gear 11 attached to gimbal 3 and meshed with the cup gear 12 which is affixed to the output shaft 13 supporting dial 10.

Under normal flight conditions of the supporting aircraft, the rotor spin axis 2—2 should remain substantially horizontal, such that, during level flight, the spin axis is perpendicular to the plane of the main gimbal 3. Occasionally, the spin axis may depart from the horizontal to an extent which necessitates a positive re-location of the rotor structure in angular relationship with the main gimbal, which is usually accomplished during substantially level flight by caging the rotor structure such that the spin axis is perpendicular to the plane of the main gimbal and then uncaging the rotor structure in that position. Such serious departure of the spin axis from the horizontal may be caused by precession due to bearing frictions, by violent maneuvers which cause the occurrence of gimbal lock or gimbal stopping actions, or, particularly, by the precessing actions accompanying forcible re-setting of the main gimbal in azimuth.

Numerous constructions of caging devices have been employed for the express purpose of orienting the rotor structure of a directional gyroscope so that the spin axis will be set normal to the plane of the main gimbal. However, the advent of smaller gyroscopic instruments has introduced the requirement that the caging devices therefor be small and light in weight, and the increasing demand for greater gyro accuracies has been attended by the requirement that uncaging of the locked relationship between the rotor structure and the main gimbal be accomplished without the introduction of undesired precessing forces. It is further essential that the caging and uncaging procedure be performed rapidly and smoothly, both to minimize the attention which the operator must devote to the matter and to eliminate violent precessions which may damage sensitive low-friction bearings.

The caging device in Figure 1 has two components rigidly attached to the rotor structure 1, a caging pin 14 and a caging cam 15, the latter being of greater thickness than the length of the pin. A cooperating caging slide unit 16 is mounted on the tracks 17 which are formed on the two sides of the gimbal. During normal uncaged conditions of the gyroscope, the slide unit 16 is in a lowered position where it is out of engagement with pin 14 and cam 15. The caged condition is brought about by mechanism which elevates the slide unit 16 to the position at which it nests with the cam and pin and prevents angular movement of the rotor structure 1 about the minor axis 4. An arrangement of elements for elevating slide unit 16 in the instrument of Figure 1, without interfering with the normal operation of the gyroscope, is shown to include a caging knob 18 disposed before the front flange 9, a shaft 19 affixed to knob 18 and carrying a caging bar 20, a trigger 21 and a U-shaped caging lever 22 pivotally supported in the main gimbal frame 5, a caging lever spring 23 lowering the lever 22 downwardly against the trigger 21 and bar 20, an annular caging ring 24 concentric with and rotatable with spur gear 11 and urged downwardly away from spur gear 11 by springs 25, a caging yoke 26 mounted on the spur gear 11 on pivots 27 and having shoulders 28 which engage pins 29 projecting upwardly from ring 24, and springs 30 biasing the slide unit against the top of the caging yoke 26.

When knob 18 is pushed inwardly toward the front flange, the bar 20 pivots trigger 21 against the caging lever 22 and spring 23, forcing the ends of the U-shaped lever 22 against the caging ring 24 to raise the ring. As ring 24 moves toward the spur gear 11 in opposition to the forces of springs 25, the pins 29 attached to the ring and engaged with the yoke shoulders 28 move upwardly and pivot the caging yoke such that its outermost edge elevates the abutting slide unit 16 along the tracks 17 in the main gimbal 3. In a manner hereinafter described, the caging pin 14 and cam 15 are engaged by the slide unit 16 to cause the desired caging or locking of the rotor structure 1 and main gimbal 3. When knob 18 is returned to its extended position, as by the action of spring 31, uncaging is accomplished automatically. This action commences with the release of trigger 21 when bar 20 is drawn outwardly with the knob 18, whereupon the caging lever 22 is lowered by spring 23, and the caging ring 24 is lowered by springs 25, the downwardly moving pins 29 on ring 24 carrying with them the caging yoke 26 and its resiliently-abutting slide unit 16.

The caging process is particularly effective as a consequence of the combination of a caging cam and pin on the rotor structure and, also, because of the unique caging slide unit on the main gimbal which cooperates with the cam and pin. An enlarged oblique view showing the reverse side of the slide unit 16 of Figure 1 appears in Figure 2. It will be noted that the body portion 32 of the slide unit is substantially U-shaped, such that there are two fingers or uprights, 33 and 34, and has four integral shoulders 35, which are channelled to accommodate the tracks 17 and guide the sliding movement along the main gimbal 3. The illustrated configuration, wherein the uprights 33 and 34 are shaped to define in the body portion 32 a substantially parabolic cam-shaped recess which matches the outline of the lower part of cam 15, is a preferred one, although it may assume other forms, such as a rectangular opening, which permit the slide unit to be elevated beyond the lower part of the cam.

In the lower part of the body portion 32 on the side of the slide unit which is disposed nearer the gyro rotor structure, there is provided a slot 36 into which a gating arrangement is partially recessed. This arrangement cooperates with caging pin 14 and comprises two gating arms, 37 and 38, pivoted on the body portion by the studs 39 and 40 which are positioned near the outer ends of the gating arms and which maintain a spacing between the oppositely-disposed inner end surfaces 41 and 42 of the gating arms defining a caging notch just sufficient to accommodate caging pin 14 without binding. The gating arms 37 and 38 are flexible in a downward direction because they are resiliently biased upwardly against the top surface 43 of slot 36 by folded leaf springs 44 and 45 which are positioned by slots 46 in the undersides of the gating arms and by openings 47 in the lower projection 48.

As Figure 1 illustrates, the caging pin 14 is positioned on one side of the rotor structure directly below the substantially parabolic caging cam 15 which is centralized about the gyro minor axis 4. Slide unit 16 is arranged with the uprights 33 and 34 and the gating arrangement on the inside of main gimbal 3, where they may cooperate with the caging cam and pin. Pin 14 projects outwardly from the rotor structure 1 a shorter distance than does cam 15, and, as depicted in Figure 2, the gating arms 37 and 38 project inwardly a greater distance than the caging uprights 33 and 34, the dimensions being selected to provide interference only between the caging pin and gating arms and between the cam and caging uprights.

Figures 3, 4 and 5 represent the gyro rotor structure and novel caging mechanism of the instrument shown in Figure 1 during successive stages of a caging operation. In Figure 3, the rotor structure appears in an attitude of counterclockwise tilting from the desired level condition, and the caging slide unit 16 has been raised to the position where the caging upright 34 has contacted the cam 15 and is applying torque thereto in a clockwise direction. Continued application of torque by upright 34 as it is elevated further causes clockwise pivotal movement of the rotor structure 1, whereupon, as is portrayed in Figure 4, caging pin 14 reaches a position where it strikes the top of caging arm 37 and deflects or flexes it against the force of leaf spring 44. Further pivotal movement of pin 14 brings it to a position where the gating arm 37 is freed and is snapped back to its fully elevated position, and where, simultaneously, the end surface 42 of the other gating arm, 38, blocks further pivotal movement of pin 14 and the attached rotor structure. At such time, the pin 14 is locked in the caging notch defined by the ends 41 and 42 of gating arms 37 and 38, the slide unit has been fully elevated, and the slide unit recess is fully mated with the caging cam 15, in the relationship illustrated in Figure 5.

Those skilled in the art will appreciate that caging is commonly performed rapidly and that the gyroscopic force acting upon the rotor structure is of considerable magnitude. When a less accurate and positive caging arrangement is employed, there is a serious likelihood that sudden changes in the attitude of the supporting craft may prevent rapid caging and cause damage to the caging mechanism, and accidental uncaging or injury to the caging arrangement may also occur during extreme maneuvers or, particularly, while the main gimbal is being set in azimuth and tends to precess the gyro rotor structure about the minor axis. In the instant caging arrangement, these difficulties are avoided because, during caging, the rotor structure pin 14 is prevented from travelling beyond the end of one of the gating arms and, immediately thereafter, is locked against movement in either angular direction by both gating arms. Once the pin is locked within the gating arms, any relative movement between the rotor structure and the main gimbal is restrained to an extent depending upon the strengths of the pin, gating arms, gating arm studs, the slide unit, and the main gimbal tracks, all of which may be made of very great strength in small dimensions. It is a distinct advantage that substantially none of the rotor structure forces are transmitted back through the mechanism which actuates the caging slide unit, once the caging is secured, whereby accidental uncaging and reflected forces on the caging knob are precluded.

Uncaging with the caging arrangement of this invention is achieved without the introduction of undesired precessing forces which might create instrument errors in azimuth. This improvement obtains because the final release of the rotor structure from its locked relationship with the main gimbal occurs when the slide unit gating arms drop away from the pin, the caging uprights having separated from the cam previously, during the initial lowering of the slide unit. When the pin 14 is free of the gating arms 37 and 38, the cam and caging slide are separated such that normal rotor structure movements will not cause interference between the parts of the caging mechanism. The precision and effectiveness with which uncaging is produced may be controlled by maintaining a close sliding fit between the pin and gating arms, and by properly positioning the pin and dimensioning the gating arms. Preferably, the caging pin is made small and is positioned at a distance below the cam which permits the ends 41 and 42 of the gating arms to be of a height which will cause the caging pin to remain locked therebetween until the slide has been lowered to a position where the cam and slide unit cannot interfere with one another.

The physical dimensions of a caging slide unit such as that of Figure 2 are small where application is made to gyroscopes of the current conventional sizes, the body portion 32 of one such unit which has been found to operate very satisfactorily measuring only about $\tfrac{9}{16}$ inch in height and $1\tfrac{3}{8}$ inch in width. Simple gating arrangements which are of particular constructional advantage in small slide units may be produced by making the gating arms and the resilient biasing means therefor integral. One such arrangement appears in Figure 6, wherein the slide unit 49 has no lower projection on the body portion 50, which is otherwise similar to body portion 32 of slide unit 16 in Figure 2 and wherein the gating arms 51 and 52 are rigidly fastened to studs 53 and 54 to preclude pivotal movement. However, gating arms 51 and 52 are formed of flexible material which permits the caging pin to deflect them downwardly, as the dotted position of gating arm 52 illustrates, and which nevertheless prevents the pin from moving the arms laterally. In Figure 7, the slide unit 55 is provided with a gating member 56 supported by studs 57 and 58 and formed of a single shaped element of material sufficiently flexible to permit deforming under downward pressure of the caging pin, in the manner depicted by the dotted position thereof which simulates the action produced by the caging pin in its pivotal descent from the right.

It should be apparent that the foregoing embodiments are susceptible of modification and variation within the scope of the invention. Thus, it is intended, for example, that the leaf springs 44 and 45 of unit 16 in Figure 2 may be replaced by other means for resiliently biasing the gating arms to their normally elevated positions. The gating members 51, 52 and 56 may be formed of stock of any suitable cross-section, such as circular or rectangular, or may be of varying thickness to cause the desired downward deformations and lateral rigidity; and the caging pin may be of any suitable configuration also. As has been mentioned hereinbefore, the recessed cam surfaces in the slide unit may be omitted entirely, the caging uprights merely being shaped to apply appropriate torque to the caging cam. Although the gating arrangements have been shown and described as part of the caging slide units, the same advantageous operation may be had when the gating arrangement is supported by the rotor structure and the caging pin is affixed to the slide unit.

While particular embodiments of the subject invention have been shown and described herein, these are in the nature of description rather than limitation, and it will occur to those skilled in the art that various changes, modifications, and combinations may be made within the province of the appended claims without departing in spirit or scope from this invention in its broader aspects.

What we claim as new and desire to secure by Letters Patent of the United States is:

1. A caging device for locking a gyro gimbal with the rotor structure pivotally mounted in said gimbal, comprising a caging slide mounted on said gimbal for sliding movement between a first position at which said rotor structure is free to pivot in said gimbal and a second position at which said rotor structure is locked with said gimbal, a caging pin on one of said rotor structure and slide, a pair of gating arms mounted on the other of said rotor structure and slide for flexing movement in one direction about their outer ends, said gating arms having their inner ends oppositely disposed to define a caging notch for said pin when not flexed, and means pivoting said rotor structure to the position at which said pin becomes locked between said gating arms when said slide is in said second position.

2. A caging device for locking a gyro gimbal with the rotor structure pivotally mounted in said gimbal, comprising a caging pin on said rotor structure, a caging slide mounted on said gimbal for sliding movement between a first position at which said rotor structure is free to pivot in said gimbal and a second position at which said rotor structure is locked with said gimbal, a pair of gating arms mounted on said slide for flexing movement in one direction about their outer ends, said gating arms having their inner ends oppositely disposed to define a caging notch for said pin when not flexed, and means pivoting said rotor structure to the position at which said pin becomes locked between said gating arms when said slide is in said second position.

3. A caging device for locking a gyro gimbal with the rotor structure pivotally mounted in said gimbal, comprising a caging pin projecting from said rotor structure, a caging slide mounted on said gimbal for sliding movement between a first position at which said rotor structure is free to pivot in said gimbal and a second position at which said rotor structure is locked with said gimbal, gating means on said slide movable in one direction by said pin when said slide is moved to said second position and limiting angular movement of said pin and its attached rotor structure when said slide is in said second position, and means pivoting said rotor structure to the position where said pin is limited by said gating means when said slide is moved from said first to said second positions.

4. A caging device as set forth in claim 3 wherein said gating means comprises two oppositely disposed gating arms pivoted on said slide near their outer ends and having their inner ends spaced apart by substantially the width of said pin, and resilient means on said slide biasing said gating arms to the position at which said inner ends of said gating arms are oppositely disposed.

5. A caging device as set forth in claim 3 wherein said gating means comprises flexible material held in position on said slide at two separated points and shaped to define a notch between different portions of said material intermediate said points, said notch being of substantially the width of said pin, and said material being disposed to be flexed by said pin when said slide is moved to said second position and to limit angular movement of said pin when said pin is locked in said notch.

6. A caging device for locking a gyro gimbal with the rotor structure pivotally mounted in said gimbal, comprising a cam mounted on said rotor structure, a caging pin projecting from said rotor structure, a caging slide mounted on said gimbal for sliding movement between a first position at which said rotor structure is free to pivot in said gimbal and a second position at which said rotor structure is locked with said slide, said slide having a pair of uprights spaced to engage said cam and pivot said rotor structure to a predetermined angular position in said gimbal, and gating means on said slide unit movable in one direction by said pin when said slide is moved to said second position and limiting angular movement of said pin and its attached rotor structure when said slide is in said second position.

7. A caging device for locking a gyro gimbal with the rotor structure pivotally mounted in said gimbal, comprising a caging pin projecting from said rotor structure, a caging slide mounted on said gimbal for sliding movement between a first position at which said rotor structure is free to pivot in said gimbal and a second position at which said rotor structure is locked with said slide, a pair of gating arms mounted on said slide for limited pivotal movement about their outer ends, means resiliently biasing said gating arms to positions at which they are disposed end-to-end and at which their inner ends define a caging notch for said pin, caging yoke means pivotally supported in a fixed relation to said gimbal for moving said slide between said first and second positions, and means mounted independently of said gyro for moving said yoke means to effect caging and uncaging of said gyro gimbal and rotor structure.

8. A caging device as set forth in claim 7 further comprising a cam mounted on said rotor structure, and a pair of caging uprights on said slide spaced to engage said cam and pivot said rotor structure to a predetermined angular position in said gimbal when said slide is moved to said second position, said slide being shaped to define a cam-shaped recess between said uprights which mates with said cam.

BENJAMIN H. PARKER.
EDWIN P. USES.

References Cited in the file of this patent

UNITED STATES PATENTS

| Number | Name | Date |
|---|---|---|
| 2,298,626 | Nisbet et al. | Oct. 13, 1942 |
| 2,369,845 | Noxon | Feb. 20, 1945 |
| 2,572,827 | Adkins et al. | Oct. 30, 1951 |
| 2,585,693 | Sinks et al. | Feb. 12, 1952 |